Oct. 11, 1938.　　　G SLAYTER ET AL　　　2,133,236
GLASS WOOL AND METHOD AND APPARATUS FOR MAKING SAME
Filed Dec. 26, 1933　　　3 Sheets-Sheet 1
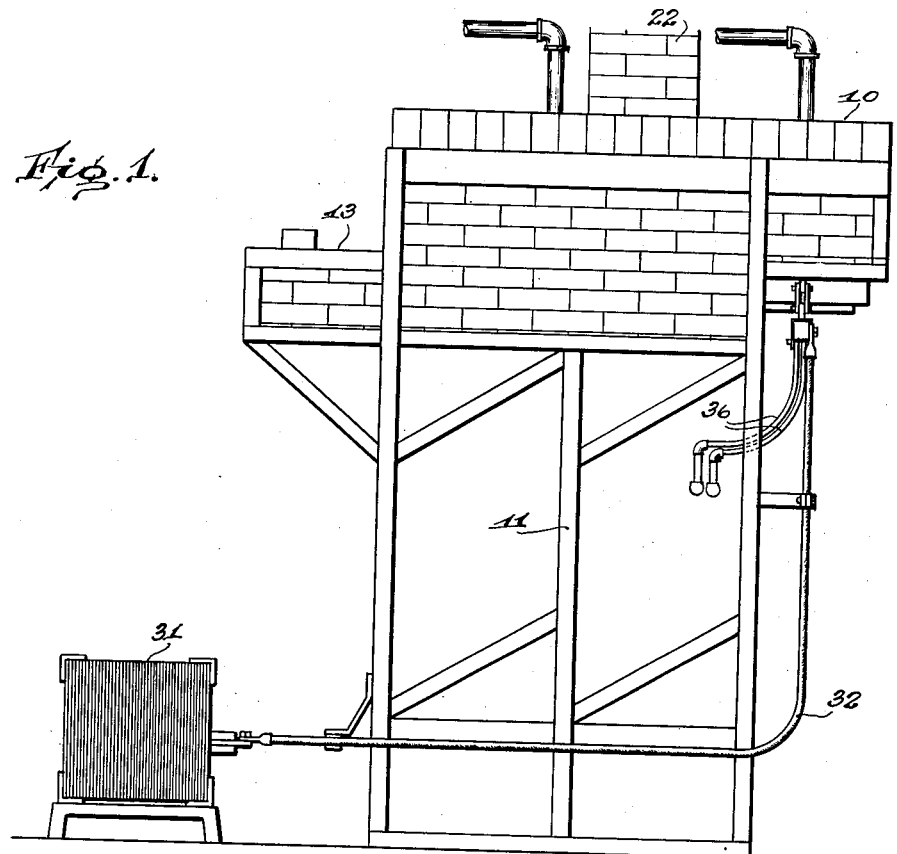
Fig.1.
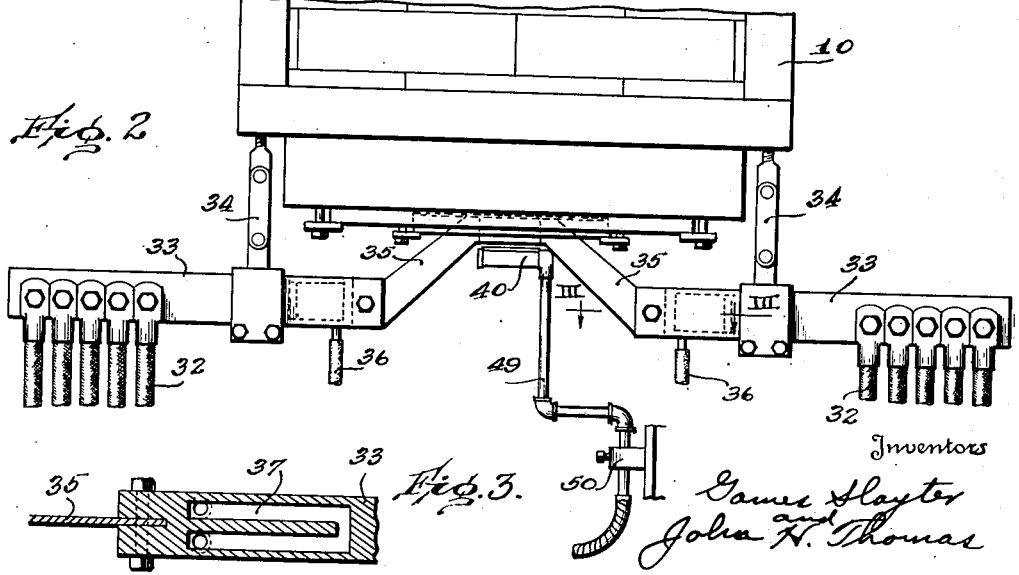
Fig.2.
Fig.3.
Inventors
Games Slayter
and
John H. Thomas
By J. F. Rule,
Attorney

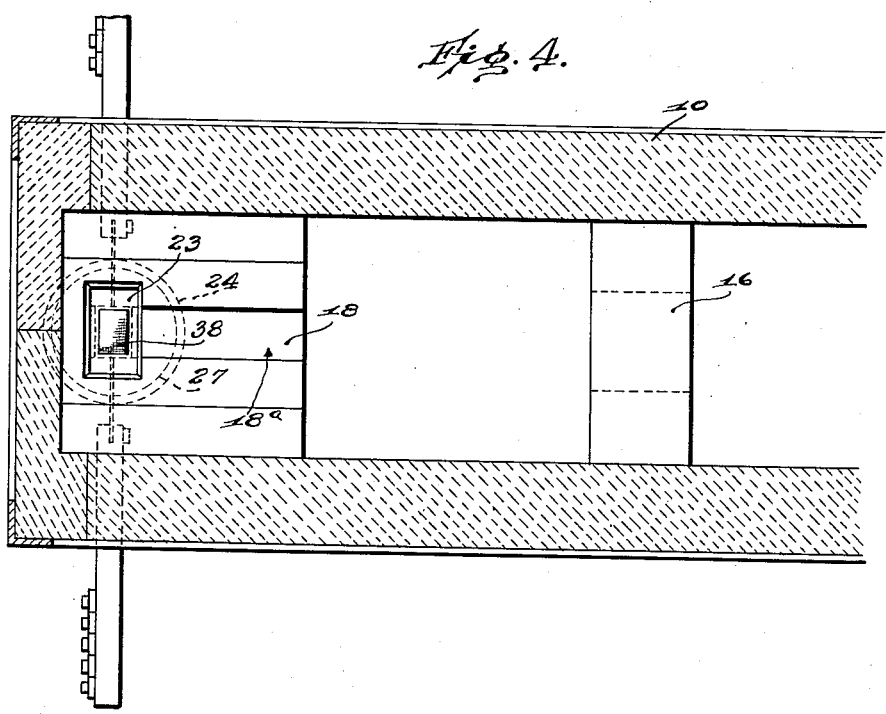
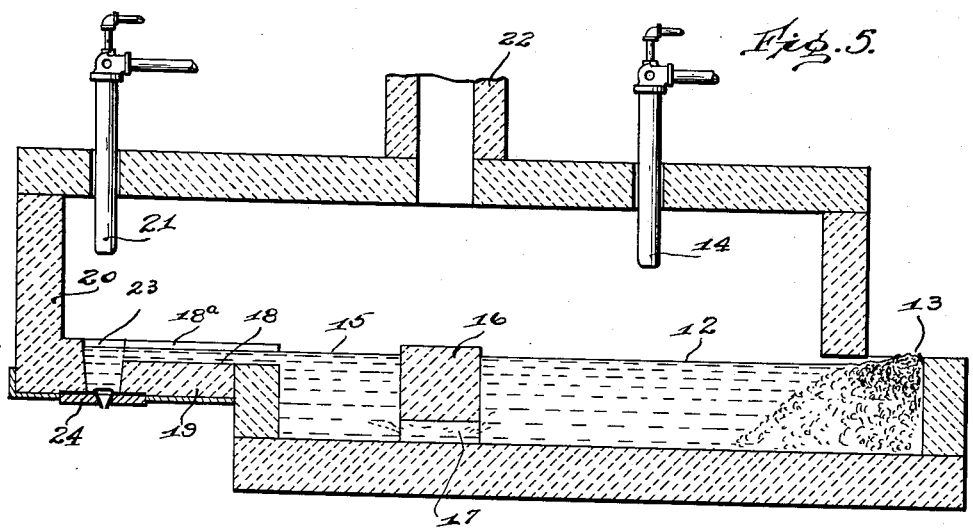

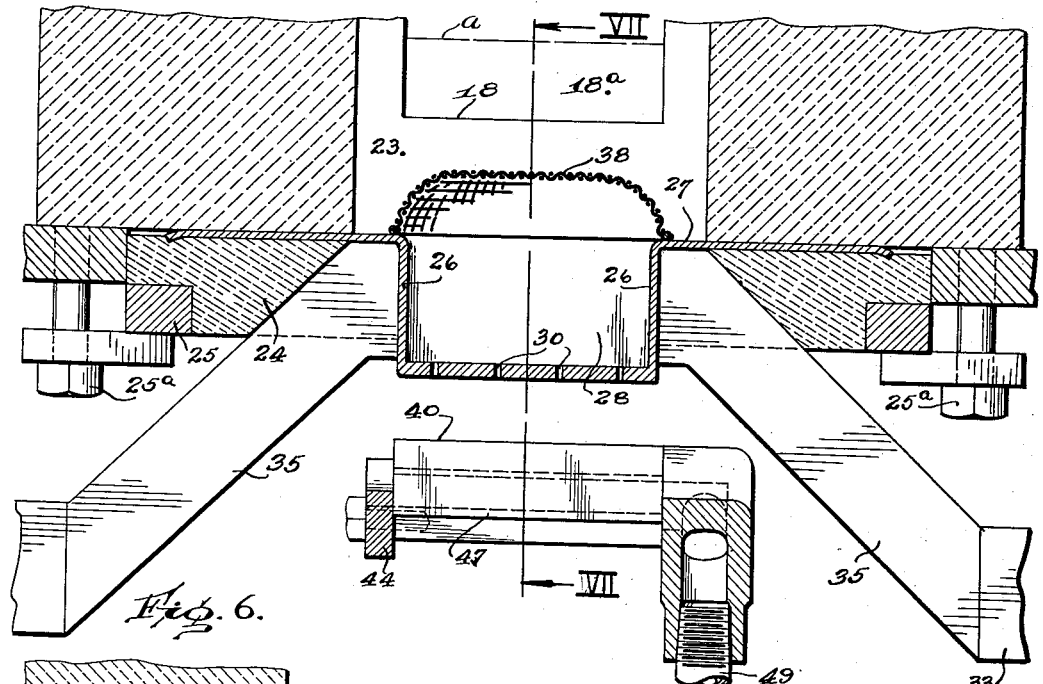
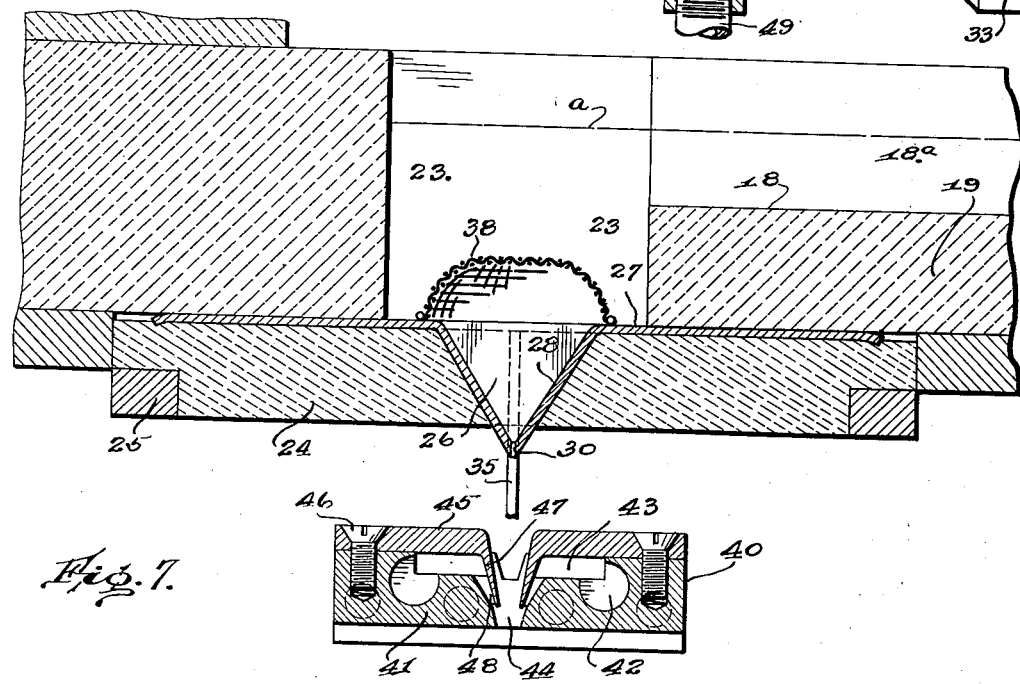

Patented Oct. 11, 1938

2,133,236

UNITED STATES PATENT OFFICE 2,133,236

GLASS WOOL AND METHOD AND APPARATUS FOR MAKING SAME

Games Slayter and John H. Thomas, Newark, Ohio, assignors to Owens-Illinois Glass Company, a corporation of Ohio Application December 26, 1933, Serial No. 704,028

39 Claims. (Cl. 49—17)

The present invention relates to a fibrous product which may be made of glass or other inorganic materials and which may be accumulated in the form of a loose fibrous mass. The invention further relates to a novel method and apparatus for making such product.

In the blowing of glass wool, difficulty has heretofore been experienced in avoiding the formation of what is known to the mineral wool trade as "shot", meaning solid bullet-like particles of relatively large diameter. This is apparently due to the disruptive character of the blast, which has been so applied as to disrupt the flowing stream of molten metal, rending or tearing it into a succession of drops which are drawn out in comet-like formation, each having such an objectionable shot-like head in addition to the attenuated tail which goes to make up the glass wool product desired.

Furthermore, although molten glass is notoriously capable of being drawn out indefinitely into threads of exceeding fineness, a property which is utilized in the well known process of producing glass silk by drawing out continuous glass filaments on a rapidly revolving drum, the disruptive character of the blast heretofore employed, which is usually introduced in an abrupt angle to the flowing stream of molten metal, has operated to break the filaments into a succession of separate lengths, longer or shorter (more or less according to the composition of the hot metal), and enough of these separate lengths are headed by the objectionable shot-like heads referred to as to quite vitiate the desired smooth and uniform quality of the entire resulting mass.

Also, the premature breaking off of the tail-like filaments by the disruptive blast before they are sufficiently attenuated, leaves them with more or less of the brittle quality ordinarily associated with cold glass, and the handling of the resultant wool develops "slivers" that penetrate the skin of the operator and offer serious objections to the product.

In many uses for which the wool is adapted, the "shot" is a highly objectionable impurity. For example, in wool used for insulating purposes, it "loads" the product with dead weight which has no insulating value and is undesirable. In preparing the better grades of wool, it has been found necessary to employ some means such as a wool vibrating frame or screen for removing the "shot", but this expedient is unsatisfactory as it is not entirely effective and adds materially to the cost of manufacture.

The present improvement, while following the well known process of blowing mineral wool by subjecting the flowing stream of the molten material (whatever its particular character) to the action of a high speed gaseous blast of steam or compressed air, is vitally distinguished from the methods previously known, in that it involves the application of the steam or compressed air to the flowing stream of molten metal in such manner as to substantially avoid the breaking or disruption of the stream while drawing out the molten metal as it cools into a substantially continuous microscopic filament—the action being in effect similar to the mechanical drawing out of filaments of glass silk by the rapidly rotating drum, but with very superior results, due to the relative simplicity of the process and the soft yielding action of the high speed gaseous blast as distinguished from the definite mechanical contact of the drum with the filament. The difference between this yielding gaseous contact and the mechanical contact of the revolving drum, also seems to favorably affect the tempering of the filament so that the product obtained by this new method of blowing is of a peculiarly resilient quality, in addition to being substantially free of "shot" or similar imperfections and of any sliver forming characteristic.

This improved method of blowing glass wool may be carried out by applying the non-disruptive blast to a single fine stream of molten glass flowing from the furnace or forehearth through a single small aperture (which may effectively be made as small as one-sixteenth of an inch in diameter), although satisfactory results can be obtained with considerable variations from this size, both ways. For practical purposes, however, especially in the making of glass wool bats or mattresses designed for insulating purposes, and bats or other forms of wool used for electrical insulation, electric storage battery separator plates, textile materials, etc., it is found desirable to provide a multiplicity of such outlet apertures so that a number of fine streams of molten glass are discharged from the furnace or forehearth and simultaneously subjected to the accelerating action of the non-disruptive blast, the velocity of which, while varying with the pressure used, will at all times be enormously greater than the natural velocity of the flowing streams of molten metal, with the result that each such stream will be drawn out into a microscopic filament of indefinite length, and so that the several such filaments when discharged into a common bin or receptacle, or onto a traveling belt or carrier, will naturally intertwine and give a felted formation of great resilience but of relatively slight specific gravity per unit of volume.

As produced in this manner, the separate filaments may be drawn out to such an exceedingly small diameter as to be incapable of being measured except by microscopic methods, some considerable samples of the resulting product showing consistent filament diameters as low as four microns, or four millionths of a meter. Theoretically, the length of these filaments is infinite, and in practice, actually runs into thousands of feet or even miles, the continuous production of the unbroken filaments depending solely on a uniform blast of the character indicated and the feeding to the discharge aperture of the forehearth of a uniform supply of molten glass. If an air bubble or "seed" in the molten metal is drawn into the discharge aperture, it may momentarily cut off the flow and sever the filament, but unless this interruption is accompanied by a plugging of the aperture, as by a "stone" or foreign substance in the supply of molten glass, the stream will immediately re-form, and being seized again by the nondisruptive blast, the process of drawing out the stream into a continuous microscopic filament of indefinite length will immediately be resumed. And while the initial formation of the stream as it first emerges from the discharge opening under the action of gravity alone, tends to produce a relatively cold head or slug somewhat analogous to the comet-like heads produced by the disruptive blast of the processes heretofore known, as above described, it is only necessary to insure a proper uniform supply of the molten glass to the discharge nozzle in order to entirely prevent this action after the process is once started, and, in practice, the resulting glass wool is practically devoid of anything but the smooth continuous filaments.

In accordance with the present method, a blast of steam or other gas is applied to a flowing stream of molten glass or other material in a manner to draw and attenuate the flowing stream into a single thread or filament which is a continuation of and integral with the molten stream, said filament being cooled and solidified by the surrounding gases or atmosphere while still an integral part or extension of the stream. The blast may be applied to the stream while the latter is at a very high temperature and in a highly fluent condition.

This method lends itself to the production of a mass of substantially straight filaments, well adapted for carding, spinning, weaving and other operations used in the manufacture of threads, yarns, woven fabrics and other articles made from textile materials. We have found that by slightly modifying the method of applying the blase of air or steam, the filaments may be given any desired amount of curl so that they may be accumulated in the form of a light fibrous mass of wool having great resiliency and elasticity, such material being well adapted for use as a heat insulater and for various other purposes.

The copending application of Games Slayter, Serial Number 697,617, filed November 11, 1933, Patent No. 2,117,371, dated May 17, 1938, Battery separator plates, describes and claims a glass wool product having the characteristics of the product disclosed in the present application and adapted to be made by the method disclosed and claimed in the present application.

The copending application of Games Slayter, Serial Number 697,618, filed November 11, 1933, Apparatus for making glass wool, discloses and claims subject-matter also disclosed in the present application.

The copending application of Games Slayter, Serial Number 685,251, filed August 15, 1933, Apparatus for blowing glass wool, discloses and claims subject-matter disclosed in the present application.

In practicing the above method of making very fine glass wool, we have found that for satisfactory results the streams of glass where they issue from the feeder outlets must be at a very high temperature, much higher than the usual working temperatures of glass or temperatures at which glass is discharged from the feeders for use in the manufacture of molded or blown articles generally. Attempts to raise the glass to such high temperature within the usual feeder boot or container from which the glass flows, have given impractical and unsatisfactory results, due in part to the fact that such extremely high temperatures cause rapid erosion and wear of the refractory walls of the container, not only destroying such walls but introducing into the molten glass a multiplicity of small stones or chunks of the refractory material, thereby vitiating the glass. These particles are drawn into the current of glass and clog up the small outlets.

Among the objects of our invention is the overcoming of these difficulties by providing efficient means for keeping the issuing streams free from impurities and the flow continuous, and also by providing means for raising the glass as it issues, to the required high temperature. In the attainment of these objects, the walls of the outlets through which the glass issues are lined with a suitable material such as platinum which will effectively withstand the high temperature and erosive action of the molten glass and which is a good electrical conductor. Such lining material is maintained at a very high temperature by the passage therethrough of an electric current, thus raising the temperature of the glass as it flows through the outlets, to the required high temperature. In order to strain from the glass, impurities such as stones or pieces of refractory material which have broken away from the walls of the container and which would clog the outlets, a strainer is provided above the outlet orifices which serves as a screen to arrest any stones or pieces of refractory material which have found their way into the current of glass. These arrested refractories are gradually dissolved so that the screen does not become clogged. As a result of this screening process, a constant supply of glass is maintained at the outlets, which is free from any foreign substances which would interfere with the continuous stream flow through the outlets.

Other objects of the invention will appear hereinafter.

Referring to the accompanying drawings:

Fig. 1 is a side elevation of an apparatus for making glass wool in accordance with the principles of our invention.

Fig. 2 is a fragmentary top plan view of the same.

Fig. 3 is a sectional detail, the section being taken at the line III—III on Fig. 2.

Fig. 4 is a sectional plan view through the furnace.

Fig. 5 is a sectional elevation of the furnace.

Fig. 6 is a front sectional elevation taken through the feeder bushing.

Fig. 7 is a section at the line VII—VII on Fig. 6.

The furnace 10 which is built of refractory material is supported at an elevated position on a framework 11. The furnace comprises a melting compartment 12 into which the batch of raw material is introduced at a dog house 13, said material being melted by means of a burner 14. The furnace also comprises a refining compartment or chamber 15 separated from the melting chamber by a wall 16, said chambers communicating through a throat or passageway 17. The glass from the refining compartment 15 flows into a forehearth extension 18 comprising a floor 19 and a front wall 20. A burner 21 may be provided for raising the temperature of the glass within the forehearth. A stack 22 is provided through which the spent gases are conducted from the furnace. The glass flows forward from the chamber 15 through a channel 18a in the floor 19 and into a well or opening 23 extending downward through the floor 19. The glass level is at or near the line a.

A circular plate or bushing 24 of clay or refractory material is located beneath the well 23 and held against the floor 19 as by means of bolts 25a engaging an iron ring 25. The bushing 24 is formed with an outlet opening or channel 26 extending therethrough, comprising downwardly converging flat side walls so that the opening is substantially V-shape in cross-section as shown in Fig. 7. A plate 27, preferably made of platinum, overlies the bushing 24 and includes a lining 28 for the walls of the opening 26. This lining is in the form of a V-shaped trough, the side walls being extended downward below the bottom surface of the bushing 24 in the form of a wedge. A series of small apertures or openings 30 extend through the platinum bushing or lining along the lower edge thereof. Each of the openings 30 permits a continuous flow of molten glass therethrough in a small stream. We have found that very satisfactory results can be obtained with openings ranging from four one-hundredths to seven one-hundredths of an inch in diameter in making very fine glass wool such as hereinbefore described and by the method herein set forth.

In order to raise the temperature of the glass as it flows through the outlet 26 and openings 30, provision is made for electrically heating the platinum lining. The electrical apparatus comprises a transformer 31 (Fig. 1) by which a commercial electric current is stepped down to a low potential. Cables 32 conduct the current between the transformer and bus-bars 33 which may be supported as by means of hangers 34 beneath the forehearth. The bars 33 are electrically connected to the platinum plate 27 by means of bars 35 made of platinum or platinum-rhodium extending diagonally upward from the bars 33 and having their upper ends fitted into the bushing 24 and soldered to the ends of the V-shaped platinum trough. It will be seen that with this construction the electric current is conducted directly through the V-shaped platinum trough so that the latter can be raised to a very high temperature. This serves to raise the temperature of the molten glass through many hundred degrees, whereby the streams of glass as they issue from the outlets 30 may be brought to as high a temperature as desired.

To prevent overheating of the bus-bars 33, we have provided cooling means comprising pipes 36 opening into a cooling chamber or passageway 37 formed in the bars, through which water or other cooling means may be circulated.

A strainer 38 is provided within the well 23 and may be supported on or attached to the platinum plate 27 in position to overlie and cover the outlet 26. This strainer comprises a screen preferably made of platinum wire and of fine mesh, the openings through the screen being smaller than the outlet openings 30. This strainer serves to arrest any stones, chunks or particles of refractory material which may find their way into the stream flow so that the glass admitted to the outlet is free from such impurities. Clogging of the openings 30 is thus prevented and a continuous stream flow through each opening is insured. Any materials arrested by the screen will gradually dissolve so that clogging of the screen is prevented.

Beneath the bushing 24 is located a blower 40. The blower comprises a body portion including blocks 41 extending lengthwise thereof, said blocks formed with pressure chambers 42 communicating through channels 43 with a passageway 44 extending lengthwise of the blower between the blocks 41. Cover plates 45 are attached by means of screws 46, said plates 45 having downwardly and inwardly inclined extensions 47 projecting into the passageway 44 and spaced from the adjoining walls of the blocks 41 to provide slits or narrow channels 48. The blower may be the same or similar in construction to that disclosed and claimed in the co-pending application of Games Slayter, Serial Number 685,251, hereinbefore referred to.

Air or steam under pressure is conveyed to the blower through a pipe 49 which communicates with the pressure chambers 42. Any desired gas pressure is thus maintained within the chamber 42 and the gas issues through the channels 48 in converging jets or sheets. These blasts of gas envelop and impinge on the small streams of molten glass which are flowing downward from the outlets 30 through the passageway 44. The streams of glass are thus enveloped in a blast of gas moving downwardly at a high velocity and are drawn by the force of this blast to greatly attenuated threads or filaments in the manner heretofore described. By means of this apparatus operating in the manner described, the streams of glass may be continuously drawn into filaments of four microns or less in diameter which may be accumulated in the form of extremely fine glass wool. The diameter of the filaments may be regulated and controlled through a wide range by varying the pressure of the steam or air supplied to the blower, by varying the temperature of the issuing glass, and by varying the size of the outlets 30. The fineness of the product obtained also depends in a measure on the formula of the glass batch or other material used in making the wool. We have found that a flint glass such as used for making bottles generally is adapted for making glass wool of the extreme fineness above described. In formulae for such glasses, the percentage of silica ($SiO_2$) ranges from seventy to seventy-eight percent, calcium oxide (CaO) from eight to eleven percent, and sodium oxide ($Na_2O$) from fourteen to eighteen percent. It will be understood, however, that other kinds of glass and vitreous or refractory materials may be used in the manufacture of a fibrous product and by the method herein disclosed. The invention, moreover, is of a scope to cover the manufacture of fibrous products from any material capable of being drawn out into fine fibers or filaments by the method herein described and claimed.

Another factor controlling the results obtained in the manufacture of glass wool by our method, relates to the position of the blower 40 relative to the feeder outlets. By suitably adjusting the blower the filaments may be made practically straight, or by a different adjustment any desired amount of curl may be imparted to the filaments. By suitable adjustments of the blower, the streams of glass may be subjected either to a straight pull by the blast, or given a swirling or irregular motion by which the filaments as they are formed are bent or curled so that the accumulating mass may have any desired amount of curl. This gives to it a lightness, resiliency and compressibility which are highly desirable when the wool is formed into mats or used in bulk for insulation or other purposes. The blower pipe 49 is adjustably mounted in a support 50 permitting vertical and other adjustments of the blower.

Modifications may be resorted to within the spirit and scope of our invention.

We claim:

1. The method which comprises, causing a movement of gas at high velocity through a predetermined zone, flowing a stream of molten glass uninterruptedly into and through said zone, causing said stream to be accelerated and drawn out continuously to a single attenuated thread or filament by the drawing force of the gas in said zone, and causing said filament to solidify while united with and forming an integral extension of said stream.

2. The method of producing glass wool which consists of subjecting a continuous flowing stream of molten glass to the drawing-out action of a non-disruptive gaseous stream of high velocity so as to produce a continuous glass filament of microscopic fineness.

3. The method of producing glass wool and forming it into intertwined continuous filaments, which comprises subjecting a continuous flowing stream of molten glass to the drawing out action of a non-disruptive gaseous stream of high velocity by which the filaments are produced in continuous lengths of microscopic fineness, and causing progressive intertwining of the filaments as they are formed.

4. The method which comprises, flowing a small stream of molten glass through space, enveloping said stream in a blast of gas moving at a high velocity in the direction of the stream flow and thereby accelerating the movement of the stream of glass and attenuating it to a single fine filament integral with and forming an extension of said stream, and causing said filament to be cooled and solidified during its passage through space and while still integrally united with the oncoming stream.

5. The method which comprises, continuously flowing a stream of molten glass, continuously drawing the stream into a single fine thread or filament by the application of an elastic moving body to said stream, and progressively cooling and solidifying the filament as it is formed.

6. The method which comprises, continuously flowing a stream of molten glass, continuously drawing the stream into a single fine thread or filament by the application of an elastic moving body to said stream, causing the glass to progressively cool and solidify while still integrally united with the stream, and causing the filament as it is formed to be progressively built into a loose fibrous mass.

7. A product of manufacture comprising a felted mass of fibers of inorganic material, said fibers having a diameter of not more than five microns and an average length of not less than three centimeters.

8. A product of manufacture comprising a mass of curled fibers of glass, said fibers having a diameter of not more than twenty microns and an average length of not less than ten centimeters.

9. A product of manufacture comprising a resilient, loosely matted mass of fibers of inorganic material of microscopic fineness, the average length of said fibers being at least ten thousand times their average diameter.

10. A product of manufacture comprising a resilient, loosely matted mass of fibers of inorganic material of microscopic fineness, the average length of said fibers being at least one hundred thousand times their average diameter.

11. A product of manufacture comprising an integrated, resilient mass of fibers of glass, the average diameter of said fibers being not more than five microns, and the average length of said fibers being at least ten thousand times their average diameter.

12. A product of manufacture comprising an integrated, resilient mass of fibers of glass, the average diameter of said fibers being not more than ten microns, and the average length of said fibers being at least ten thousand times their average diameter.

13. The combination of a container for molten glass, means providing an outlet opening through which the glass issues in a small stream, means for raising the temperature of the glass during its passage through said outlet, and means for enveloping the stream in a blast of gas moving at a high velocity and causing the stream of glass to be drawn continuously into an attenuated filament by the force of the blast.

14. The combination of a container for molten glass, means providing an outlet opening through which the glass flows from the container in a continuous stream, said opening being not more than seven hundredths of an inch in diameter, and pneumatic means for drawing said stream continuously into a greatly attenuated filament while still integrally united with the supply body.

15. The combination of a container for molten glass, means providing an outlet opening through which the glass flows from the container in a continuous stream, said opening being not more than seven hundredths of an inch in diameter, means for raising the temperature of the glass during its passage through said outlet to a higher temperature than that of the glass within the container, and pneumatic means for drawing said stream continuously into a greatly attenuated filament while still integrally united with the supply body.

16. The combination of a container for molten glass, means providing an outlet opening through which the glass flows from the container in a continuous stream, said opening being not more than seven hundredths of an inch in diameter, pneumatic means for drawing said stream continuously into a greatly attenuated filament while still integrally united with the supply body, said outlet having a lining of material which is an electrical conductor, and means for flowing an electric current through said lining and raising it to a higher temperature than that of the glass within the container and thereby raising the temperature of the glass as it flows through said outlet.

17. The combination of a container for molten glass, a bushing in a wall of the container having an outlet opening extending therethrough for the passage of a stream of glass, a platinum lining for said opening, means for passing an electric current through said lining and thereby raising the temperature of the stream of glass flowing therethrough, and means for continuously drawing the stream of glass to an attenuated filament.

18. The combination of a container for molten glass, a bushing in a wall of the container having an outlet opening extending therethrough for the passage of a stream of glass, a platinum lining for said opening, means for passing an electric current through said lining and thereby raising the temperature of the stream of glass flowing therethrough, and means for continuously drawing the stream of glass to an attenuated filament, said opening having a diameter between four hundredths and seven hundredths of an inch.

19. The combination of a container for molten glass having an outlet opening, a platinum screen within the container providing a strainer through which the molten glass flows to said outlet opening, a platinum lining for said outlet opening, and means for passing an electric current through said lining and raising the temperature of the glass as it flows through the outlet opening.

20. A container for molten glass comprising a floor of refractory material, said floor formed with an outlet opening therethrough comprising downwardly convergent walls, a lining of electrically conducting sheet material covering said walls and forming a V-shaped trough, said trough formed with small apertures through the bottom thereof for the passage of streams of molten glass, means for supplying molten glass to said container and causing it to flow through said openings, and means for passing an electric current through said lining and raising the temperature of the glass flowing therethrough to a higher degree than the glass within the container.

21. A container for molten glass comprising a floor of refractory material, said floor formed with an outlet opening therethrough comprising downwardly convergent walls, a lining of electrically conducting sheet material covering said walls and forming a V-shaped trough, said trough formed with small apertures through the bottom thereof for the passage of streams of molten glass, means for supplying molten glass to said container and causing it to flow through said openings, means for passing an electric current through said lining and raising the temperature of the glass flowing therethrough to a higher degree than the glass within the container, and a strainer within the container consisting of a screen positioned above said outlet, the apertures through said screen being smaller than said outlet openings.

22. A container for molten glass comprising a floor of refractory material, said floor formed with an outlet opening therethrough comprising downwardly convergent walls, a lining of electrically conducting sheet material covering said walls and forming a V-shaped trough, said trough formed with small apertures through the bottom thereof for the passage of streams of molten glass, means for supplying molten glass to said container and causing it to flow through said openings, means for passing an electric current through said lining and raising the temperature of the glass flowing therethrough to a higher degree than the glass within the container, and a blower positioned beneath said outlet openings and arranged to direct a blast of gas downwardly in contact with the streams of molten glass and draw the latter out into fine filaments.

23. A container for molten glass having an outlet opening extending through the floor thereof, the walls of said opening being downwardly convergent, and linings of sheet metal covering said walls and converging downwardly to a meeting line below said walls and formed with outlet openings therethrough at said meeting line.

24. An insulating material of glass wool formed of a multiplicity of intertwined filaments in substantially continuous lengths of microscopic fineness.

25. A container for molten glass having an outlet opening extending through the floor thereof, the walls of said opening being downwardly convergent, linings of sheet metal covering said walls and converging downwardly to a meeting line below said walls and formed with outlet openings therethrough at said meeting line, and means for passing an electric current through said linings and raising the temperature thereof at said outlet openings.

26. The method which comprises, producing an uninterrupted stream flow of molten glass, accelerating the movement of the glass through a predetermined zone by the application of an elastic moving body to the surface of the stream, and thereby continuously drawing the stream of glass to a single attenuated filament.

27. The method which comprises, causing a movement of gas at high velocity through a predetermined zone, flowing a stream of molten glass uninterruptedly into and through said zone, and causing said stream to be accelerated and drawn out continuously to a single attenuated filament by the drawing force of the gas in said zone.

28. The combination of a container for molten glass, means providing an outlet opening through which the glass flows from the container in a continuous stream, said opening being not more than seventeen hundredths of an inch in diameter, and pneumatic means for drawing said stream continuously into a greatly attenuated filament while still integrally united with the supply body.

29. The combination of a container for molten glass, a bushing in a wall of the container having an outlet opening extending therethrough for the passage of a stream of glass, a platinum lining for said opening, means for passing an electric current through said lining and thereby controlling the temperature of the stream of glass flowing therethrough, and means for continuously drawing the stream of glass to an attenuated filament.

30. The combination of a container for molten glass, a bushing in a wall of the container having an outlet opening extending therethrough for the passage of a stream of glass, a metal lining for said opening, means for passing an electric current through said lining and thereby controlling the temperature of the stream of glass flowing therethrough, and means for continuously drawing the stream of glass to an attenuated filament.

31. The method of treating a material which is capable of assuming a semi-fluid or viscous condition and gradually increasing in viscosity and hardening when passed in stream formation through a gaseous medium and without change in chemical composition, which method comprises, projecting from a supply body of such material, an uninterrupted stream in a semi-fluid or plastic condition, and drawing said stream continuously to a single attenuated filament of many times smaller diameter than said stream by applying an elastic moving body to the surface of the stream and in the general direction of the stream flow.

32. The method of treating a material which is molten at a high temperature and which gradually increases in viscosity and solidifies while cooling to atmospheric temperatures, which method comprises, projecting from a supply body of the molten material, an uninterrupted stream, drawing said stream continuously to a single attenuated filament of many times smaller diameter than said stream by applying an elastic moving body to the surface of the stream and in the general direction of the stream flow while the material is in a viscous condition, and causing the attenuated stream or filament to solidify while moving through space and while still integrally united with the supply body.

33. The method of treating a material which is molten at a high temperature and which gradually increases in viscosity and solidifies while cooling to atmospheric temperatures, which method comprises producing an uninterrupted stream flow of the molten material, accelerating the movement of the flowing material through a predetermined zone by pressure of an elastic moving body applied to the surface of the stream and moving substantially in the direction of the stream flow and thereby continuously drawing the stream to a single attenuated filament or fiber.

34. A product of manufacture comprising a multiplicity of fabricated fibers of inorganic material, said fibers having average diameters of not more than five microns and an average length of not less than three centimeters.

35. A product of manufacture comprising a fabricated mass of glass fibers, said fibers having an average diameter of not more than ten microns and an average length of not less than five centimeters.

36. A product of manufacture comprising a fabricated mass of glass fibers, said fibers having an average diameter of not more than ten microns, an average length of not less than three centimeters, and each of said fibers being substantially uniform in diameter throughout its length.

37. A product of manufacture comprising an integrated resilient mass of long, attenuated, fine glass fibers, the average diameter of said fibers being not more than ten microns, and each of said fibers being free from a taper and being substantially uniform in thickness throughout its length.

38. As an article of manufacture, a loosely matted mass of fibers of glass, said mass comprising an interfelted body of long, fine glass fibers, each of said fibers having a substantially uniform diameter throughout its length, and said mass having a density of not more than four pounds per cubic foot and having sufficient elasticity and compressibility to permit it to be reduced to less than half of its volume by pressure applied to the mass and cause it to expand to its original volume when the pressure is removed.

39. As an article of manufacture, a loosely matted mass of fibers of glass, said mass comprising an interfelted body of long, substantially straight, fine glass fibers, substantially all of said fibers having a substantially constant diameter throughout their length, the individual fibers being of such fineness and length and so interfelted as to form a mat having a density of not more than four pounds per cubic foot and having sufficient elasticity and compressibility to permit it to be reduced to less than half of its volume by pressure applied to the mass and cause it to expand to its original volume when the pressure is removed.

JOHN H. THOMAS.
GAMES SLAYTER.